United States Patent [19]
Pleasants

[11] 3,740,869
[45] June 26, 1973

[54] SELF-ANSWERING PROGRAMMED INSTRUCTION DEVICE

[76] Inventor: Donald Adair Pleasants, 711 Marine Bank Building, Tampa, Fla. 33602

[22] Filed: Nov. 23, 1971

[21] Appl. No.: 201,063

[52] U.S. Cl. .................................................. 35/9 C
[51] Int. Cl. .............................................. G09b 7/02
[58] Field of Search ............................... 35/9 C, 9 B

[56] References Cited
UNITED STATES PATENTS 3,106,784  10/1963  Raley .................................... 35/9 C
3,508,349  4/1970  Gilden et al. ...................... 35/9 B X

FOREIGN PATENTS OR APPLICATIONS 284,447  11/1952  Switzerland ........................... 35/9 C Primary Examiner—Wm. H. Grieb

[57] ABSTRACT

The present invention relates to a device for programmed instruction which permits a student to determine the correct answers to successive questions and answers by placing a stylus in contact with an electrical lead printed on the page of the text which activates an electrical circuit by which a visable or audible signal is transmitted to the student.

10 Claims, 5 Drawing Figures

INVENTOR.
DONALD A. PLEASANTS

INVENTOR.
DONALD A. PLEASANTS

3,740,869

SELF-ANSWERING PROGRAMMED INSTRUCTION DEVICE

BACKGROUND OF THE INVENTION

The term "programmed instruction" has come to be applied to instruction involving successive questions and answers in which the question is designed so as to suggest the correct answer. Such an arrangement facilitates learning since it has been established that learned material associated with or reinforced by the successful completion of a problem tends to be effectively retained by the student. Text books have been designed utilizing such question and answer techniques in which the answer is recorded in the book. A further advantage in reenforcing the learning may be obtained when the student can determine the correct answer instantaneously. Also the fact that the correct answer is signaled by a light or audio signal provides some entertainment value and is in itself psychologically rewarding to the student.

Several devices have been developed using electrical circuits to indicate correct responses to questions. Devices involving computers record correct and incorrect answers but are too complex and expensive to be available to numbers of students, for example, each student in a classroom. Other devices have utilized circuits with electrical contacts in fixed locations which connect with cards placed over the contacts and involve circuits completed by pressing a button associated with the correct answer. Such devices necessarily involve a fixed number of questions and answers per card and do not permit the random placement of questions and answers which contribute to a creative and interesting textual presentation. Other devices utilizing printed sheets with apertures permitting access to an underlying circuit, also involve the disadvantage of fixed location or locations for correct answers.

SUMMARY OF THE INVENTION

The primary disadvantage of the devices referred to above, to wit; the necessity of underlying circuits or contacts having fixed locations thus severely limiting the flexibility and desirability of the device, is obviated in this invention by the use of an electrical lead which can be printed at random on the page of the text itself. A problem exists in that the nature of printable conductive materials is such that a printed electrical lead cannot transmit enough electrical currrent to activate a visual or audio signal. By employing a second circuit to supply current to the visual or audio signal, however, enough current can be supplied to activate the signal. The second circuit employs a silicone controlled rectifier and is activated by a small amount of current received from the electrical lead printed on the page of the text.

The present invention is designed to stimulate the student while instructing and may be cheaply enough produced to be available to a mass of students. It is a self-answering programmed instruction device which employs textual material interspersed with questions and answers. For example, a paragraph of text may be followed by a question based on the preceeding paragraph. A dot or space representing each possible answer is presented. The dot or space related to the correct answer is touched by a stylus attached to the device by an electric cord. An electrical circuit capable of transmitting a limited current is printed on the question and answer sheet connecting the correct answer with a terminal on the device. When the stylus touches the dot or space representing the correct answer, another wired circuit is activated by use of a silicone controlled rectifier and a buzzer sounds or a light is activated. Since the initial electrical lead is printed on the sheet itself, there is no fixed pattern or fixed number of questions and answers. The flexibility of this arrangement also permits the use of illustrations and an arrangement of such illustrations, textual material, and questions and answers totally determined by the most effective presentation of the material itself, rather than in fixed patterns which may become boring through repetition.

DETAILED DESCRIPTION OF THE INVENTION

Figure 1:
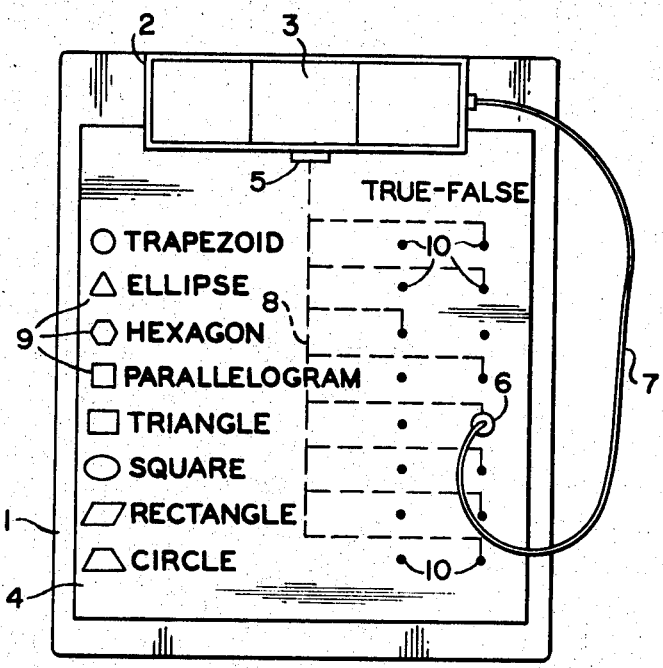
FIG. 1 is a top view of the device, the initial electrical leads printed on the question and answer sheet being invisible on the actual sheets but represented here by broken lines.

Referring first to FIG. 1 of the drawings, the preferred embodiment of the present invention includes a housing composed of a program sheet station, such as a rectangular and flat board 1 with a hollow container 2 with an inclined top partially composed of translucent material 3 through which the signal light may be seen. A program sheet 4 on which is printed textual material is placed on the top surface of the device. When placed upon the surface of the device the sheet on which is printed the textual material and questions and answers 4 is clamped in place by a simple metal clip 5. A manually operable contact means, such as a stylus 6 is joined to the hollow container by electrical cord 7. The initial electrical lead 8 on an electrical conductor is printed on the surface of the sheet of text itself. The lead is electrically connected by the clip 5 to the signal activating circuit contained inside the hollow container 2 which activates a signal light visible through the translucent panel of the container 3.

In order for the device to function, the electrical leads on the question and answer sheet 8 must be invisible. This can be accomplished by overprinting the electrical circuit with a solid coat of white or colored ink, and then printing the textual material, the illustrations and questions and answers, on the resulting surface. As an alternative method the electrical circuit may be printed on an underlying sub-strate of paper or thin plastic. An overlying sheet of paper with an adhesive backing is then placed upon the sub-strate effectively masking the electrical circuit. The underlying substrate and the overlying sheet may be called the undersheet and oversheet of the program sheet, and the oversheet may be provided with apertures which are associated with the correct solutions, to give the manually operable contact means, such as the stylus 6, access to the printed electrical conductor on the undersheet to close the circuit for a correct solution.

Figure 2:
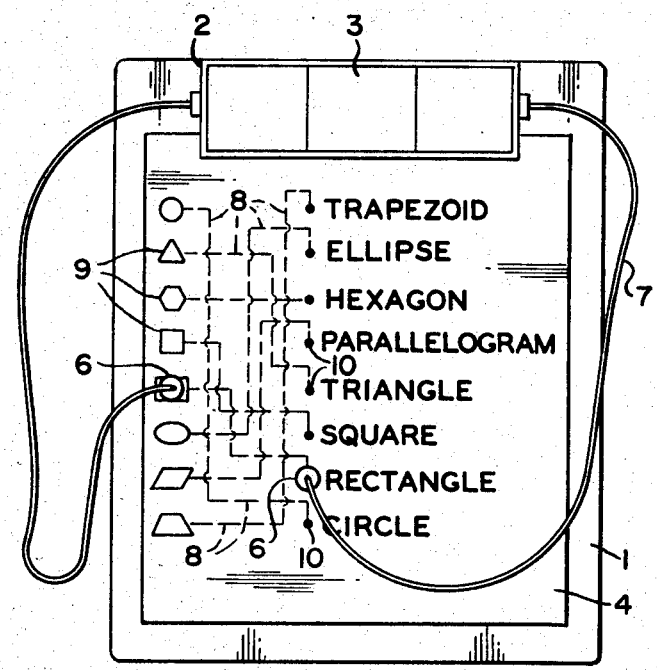
FIG. 2 shows the use of the device, with two styluses, for matching sets of questions and answers.
Figure 3:
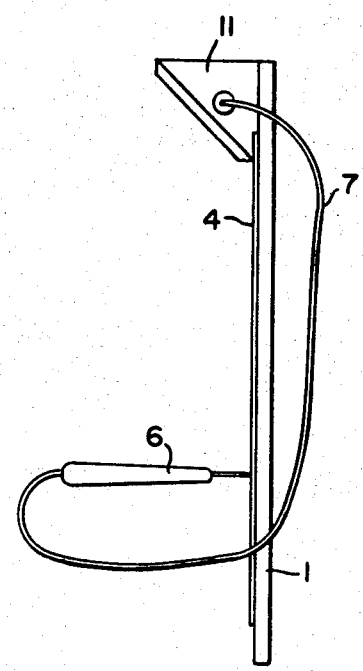
FIG. 3 is a side view of the device.

The device may also be so constructed as to permit use of matching questions and answers. FIG. 2 shows such a modification with two styluses 6 used. Each stylus is placed in contact with one end of a printed electrical lead 8 which joins the correct question 9 and answer 10.

The hollow container housing the signal activating circuit may have a triangular construction 11 to present to the student the translucent panel through which the signal may be seen.

Figure 4:
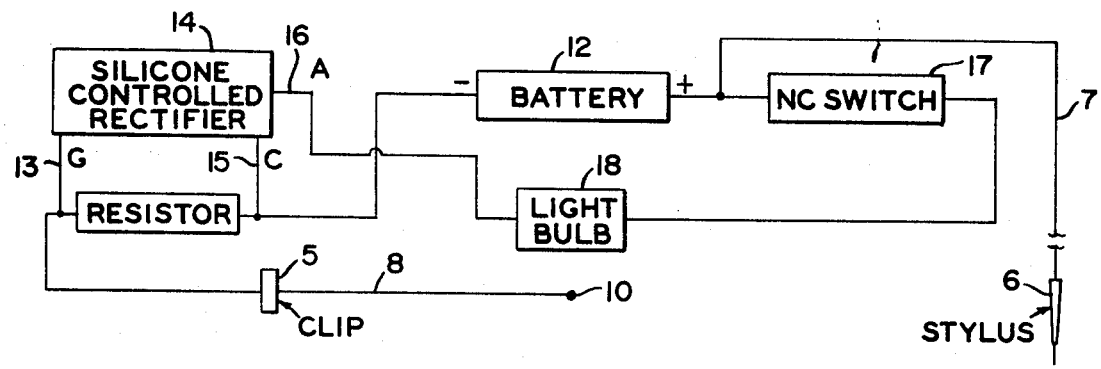
FIG. 4 is an electrical diagram showing the circuit which activates the signal including a re-set switch to manually terminate the signal.

Referring particularly to FIG. 4 the battery 12 imparts an electrical current to the cord 7 which is connected to the stylus 6. When the stylus 6 is placed in contact with the electrical lead 8 printed on the question and answer sheet a small amount of electrical current is transmitted through the lead 8 to the clip 5, which current is then transmitted to the gate 13 of the silicone controlled rectifier 14 causing the gate to complete the circuit by causing conduction between the cathode 15 and the anode 16 of the silicone controlled rectifier. The current generated by the battery 12 then no longer flows through the card, stylus and printed electrical lead but rather through the signal activating circuit, i.e., through the normally closed manually operated switch 17 to the signal light bulb 18 and then to the anode 16 of the silicone controlled switch 14, which transmits the current to the cathode 15 of the switch which returns the current to the negative terminal of the battery.

By use of the circuit described above the signal can be activated even though the nature of printable conductive materials is such that the electrical lead 8 printed on the sheet itself is capable of transmitting only a small amount of electrical current.

The signal activating circuit shown in FIG. 4 will remain closed and operative so as to keep the signal in a state of activity until the circuit is interrupted. The interruption of the circuit is accomplished by the manually operated normally closed switch 17 which is operated by the student to turn off the signal until the signal is reactivated by placing the stylus in contact with the next correct answer.

Figure 5:
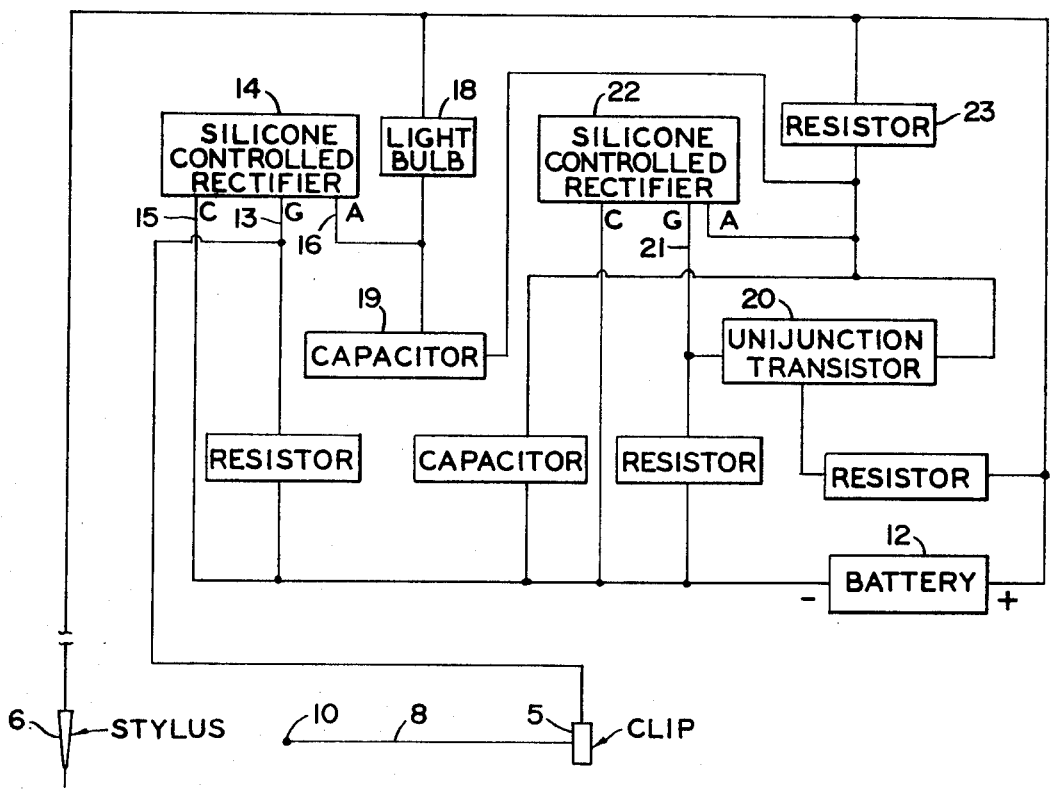
FIG. 5 is an electrical diagram showing the circuit which activates the signal including a second silicone rectifier and a unijunction transistor to automatically terminate the signal.

To avoid the necessity of manually interrupting the signal activating circuit another circuit is employed in another embodiment of the device to automatically interrupt the signal. Referring particularly to FIG. 5 the battery 12 imparts an electrical current to the stylus 6. When the stylus 6 is placed in contact with the printed electrical lead 8 a small amount of electrical current is transmitted to the clip 5 and then to the gate of the silicone controlled rectifier 14 thereby causing conduction between the cathode 15 and anode 16 of the silicone controlled rectifier causing current to flow through a circuit comprised of the silicone controlled rectifier 14, battery 12, and signal light bulb 18, and the wired electrical leads between those components.

Included in this signal activating circuit as a by-pass is a second interrupting circuit comprised of a capacitor 19 which stores electrical energy until a determined potential is achieved. The stored current is then discharged through a unijunction transistor 20 to the gate 21 of a second silicone controlled rectifier 22 causing the current to flow through a circuit comprised of the second silicone controlled rectifier 22, a resistor 23, the battery 12, depleting the current supply received by the silicone controlled rectifier 14 of the signal activating circuit thereby terminating the conduction of current between the cathode 15 and anode 16 of the silicone controlled rectifier 14 and so terminating the flow of current in the signal-activating circuit which deactivates the signal. When the discharge of such potential is completed the lack of current through the resistor 23 causes the second silicone controlled rectifier 22 to revert to its open position and current can again to flow through the signal activating circuit causing the signal to be reactivated.

The alternations between the signal activating circuit and the interrupting circuit occur with great rapidity and cannot be detected by the human eye or ear which perceives the signal as being continuously activated while the stylus continues to be in contact with the printed electrical lead. When the stylus is no longer in contact with the printed electrical lead the silicone controlled rectifier 14 no longer operates to close the signal activating circuit and the signal remains deactivated until the stylus is placed in contact with the next correct answer.

What is claimed is:

1. A self-answering programmed instruction device comprising, a housing, an electrical circuit system associated with said housing including at least one first circuit means comprising a rectifier including control gate means, signal means, switching means, together with at least one second circuit means comprising resistance means and an open circuit portion between a pair of electrical contact means, with at least one of said electrical contact means being attached to a flexible conduit for manual positioning; in combination with at least one separable program sheet comprising at least one program problem and at least one correct problem solution and at least one electrical conductor including a lead associated with said correct problem solution, together with indicator means associated with said correct problem solution lead: in which said electrical contacts of said open circuit portion of said second mentioned circuit means may be selectively contacted against said electrical conductor with said program sheet, with said manually operable contact means on the conductor for the correct problem solution thereby closing said second circuit means to operate said first circuit means to activate the signal means when said normally closed switching means is in closed position.

2. A self-answering programmed instruction device as claimed in claim 1, in which the switching means of the first circuit means comprises an interrupting circuit including capacitor means and a second rectifier and a unijunction transistor in which the capacitor controls the control gate of the second mentioned rectifier through the uni-junction transistor to operate the first circuit means which will alternately close and open rapidly as long as the electrical contacts of the second circuit means remain in contact with the correct program solution lead, thereby providing an apparently continuous signal.

3. The self-answering programmed instruction device as claimed in claim 1, in which the program sheet comprises an oversheet and an undersheet with said program sheet electrical conductor printed between said sheets.

4. The self-answering programmed instruction device as claimed in claim 3, in which the program sheet electrical conductor is printed on the undersheet, being an underlying substrate of paper or thin plastic, which is covered by the oversheet, of similar material, on which textual material is printed and said oversheet having apertures positioned to expose points on the program sheet electrical conductor which are associated with correct problem solutions, thereby giving the manually operable contact means access to the printed electrical conductor on the underlying substrate to indicate a correct solution.

5. A self-answering programmed instruction device as claimed in claim 1, in which there are a plurality of problems and a plurality of correct solutions and a plurality of incorrect solutions with each correct solution being associated with at least one program sheet electrical conductor.

6. The self-answering programmed instruction device as claimed in claim 5, in which the switching means of the first circuit means comprises an interrupting circuit including capacitor means and a second rectifier and a uni-junction transistor in which the capacitor controls the control gate of the second mentioned rectifier through the uni-junction transistor to operate the first circuit means which will alternately close and open rapidly as long as the electrical contacts of the second circuit means remain in contact with the correct program solution lead, thereby providing an apparently continuous signal.

7. The self-answering programmed instruction device as claimed in claim 6, in which the housing is provided with a program sheet station.

8. The self-answering programmed instruction device as claimed in claim 7, in which one of the pair of electrical contacts of the second circuit means is in the form of clip means positioned to clip at least one program sheet to said program sheet station and to contact said program sheet electrical lead.

9. The self-answering programmed instruction device as claimed in claim 8, in which one of the pair of electrical contacts in the second circuit means, being the manually operable contact means, is in the form of a stylus.

10. The self-answering programmed instruction device as claimed in claim 9, in which the program sheet electrical conductor is printed on the undersheet, being an underlying substrate of paper or thin plastic, which is covered by the oversheet, of similar material, on which textual material is printed and said oversheet having apertures positioned to expose points on the program sheet electrical conductor which are associated with correct problem solutions, thereby giving the stylus access to the printed electrical conductor on the underlying substrate to indicate a correct solution.

* * * * *